(12) United States Patent
Ghatak et al.

(10) Patent No.: US 11,048,880 B2
(45) Date of Patent: Jun. 29, 2021

(54) AUTOMATIC SUMMARIZATION OF CONTENT IN ELECTRONIC MESSAGES

(71) Applicant: Microsoft Technology Licensing, LLC, Redmond, WA (US)

(72) Inventors: Kausik Ghatak, Bangalore (IN); Ganessh Kumar R P, Bangalore (IN); Priyanka Goel, Bangalore (IN); Neeraj Singh, Bangalore (IN); Swathi Karri, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 16/252,799

(22) Filed: Jan. 21, 2019

(65) Prior Publication Data

US 2020/0233926 A1 Jul. 23, 2020

(51) Int. Cl.
  *G06F 40/30* (2020.01)
(52) U.S. Cl.
  CPC .................... *G06F 40/30* (2020.01)
(58) Field of Classification Search
  CPC ....................................... G06F 16/345
  See application file for complete search history.

(56) References Cited

U.S. PATENT DOCUMENTS

| 8,150,924 | B2 | 4/2012 | Buchheit et al. |
| 9,116,984 | B2 | 8/2015 | Caldwell et al. |
| 9,356,889 | B2 | 5/2016 | Caskey et al. |
| 2003/0028603 | A1 | 2/2003 | Aktas et al. |
| 2004/0117340 | A1* | 6/2004 | Blitzer .................. G06F 16/345 |
| 2007/0250576 | A1* | 10/2007 | Kumar ................ G06Q 10/107 709/206 |
| 2008/0109425 | A1* | 5/2008 | Yih ....................... G06F 16/345 |
| 2008/0281922 | A1 | 11/2008 | Renshaw et al. |
| 2008/0281927 | A1 | 11/2008 | Vanderwende et al. |
| 2008/0282159 | A1 | 11/2008 | Vanderwende et al. |
| 2012/0110090 | A1 | 5/2012 | Jensen et al. |
| 2012/0179449 | A1* | 7/2012 | Raskino ................ G06F 16/345 704/2 |
| 2013/0006973 | A1* | 1/2013 | Caldwell ............... G06F 16/345 707/723 |

(Continued)

OTHER PUBLICATIONS

"International Search Report and Written Opinion Issued in PCT Application No. PCT/US2020/012287", dated Apr. 16, 2020, 12 Pages.

(Continued)

*Primary Examiner* — Brian L Albertalli
(74) *Attorney, Agent, or Firm* — Liang IP, PLLC

(57) ABSTRACT

Email servers configured to perform automatic summarization of content in electronic messages are discloses herein. In one embodiment, upon receiving an email, an email server determines whether the incoming email is a templated message. In response to determining that the incoming email is not a templated message, the email server classifies one or more sentences in the email as a statement of decision, judgement, inference, or fact, cluster the classified statements into clusters, and select one or more of the clusters to automatically generate summaries of the incoming email. The email server can then insert data representing the generated summaries into the email before transmitting the email to a destination via a computer network.

20 Claims, 7 Drawing Sheets

(56) References Cited

U.S. PATENT DOCUMENTS

| | | |
|---|---|---|
| 2013/0268839 A1 | 10/2013 | Lefebvre et al. |
| 2015/0269242 A1 | 9/2015 | Dey et al. |
| 2015/0341300 A1* | 11/2015 | Swain .................. G06F 16/287 |
| | | 707/738 |
| 2016/0364608 A1* | 12/2016 | Sengupta .............. G06F 16/345 |
| 2016/0378849 A1* | 12/2016 | Myslinski ........... G06F 16/3334 |
| | | 707/691 |
| 2017/0161372 A1 | 6/2017 | Fern ndez et al. |
| 2018/0176163 A1 | 6/2018 | Arquero et al. |
| 2019/0205395 A1* | 7/2019 | Bonin .................... G06F 40/30 |

OTHER PUBLICATIONS

"Application Filed in PCT Application No. PCT/US2018/055119", Filed on Oct. 10, 2018, 34 Pages.

Sood, Arpit, "Towards Summarization of Written Text Conversations", In Thesis of Master of Science of International Institute of Information Technology, Jun. 2013, 70 Pages.

* cited by examiner

AUTOMATIC SUMMARIZATION OF CONTENT IN ELECTRONIC MESSAGES

BACKGROUND

Automatic summarization is a process of shortening an original text with software to create a summary with major points of the original text. Technologies that can make a coherent summary take into account variables such as length, writing style, and syntax. Two techniques to automatic summarization include extraction and abstraction. Extractive techniques select a subset of existing words, phrases, or sentences in the original text to form a summary. In contrast, abstractive techniques can build an internal semantic representation of the original text, and then use natural language generation to create a summary that is closer to what a human might express.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though extractive and abstractive techniques may be sufficient for automatically summarizing documents such as news stories, scientific papers, etc., such techniques can be insufficient for summarizing content of electronic messages (e.g., emails) exchanged between users using computers, smartphones, or other suitable types of computing devices. One reason for such insufficiency is that status of content in emails can be dynamic, i.e., changing over time. For example, a statement directed toward an early event may not be as relevant now as then. Another reason can be that relevance of content in emails can depend on a context of corresponding email communication. For example, a short statement from a manager in an organization can be more relevant than multiple long statements made by his/her subordinates.

Several embodiments of the disclosed technology can address at least some of the foregoing difficulties by implementing context-based automatic summarization of content in emails and/or other suitable types of electronic messages. In one implementation, an email server can be configured to receive an email destined to or generated by a user. Upon receiving the email, an automatic summarizer at the email server (or otherwise having access to the received email) can be configured to perform first and second stages of summarization processing on the received email, as described in more detail below. In another implementation, the automatic summarizer can be independent of the email server. In other implementations, the automatic summarizer can also be configured to perform text to speech conversion of an automatically generated summary of the email, insertion of a summery to the email, or other suitable operations.

In certain embodiments, at the first stage of summarization processing, the automatic summarizer can be configured to determine whether the received email is a templated message. Without being bound by theory, it is believed that emails exchanged in enterprises, government offices, schools, or other suitable types of organizations can often be templated messages. Example templated messages can include messages related to out of office (OOF), personal leave, work from home (WFH), meeting invitation, automated response, status update, welcome remark, meeting memo, etc. In one implementation, the automated summarizer can be configured to detect such templated messages via machine learning using, for instance, a training dataset. As such, a machine learning model may be developed to include keywords/key phrases (e.g., "OOF," "WFH," etc.) that are indicative of a templated message. In other implementations, the automated summarizer can also be configured to detect such templated messages using pre-configured message templates provided by administrator, or via other suitable techniques.

The foregoing templated messages can be efficiently summarized using pre-configured summary templates. For instance, a summary template for an OOF message can include "[sender] is OOF from [Date/Time1] to [Date/time2]" in which parameters (e.g., "sender") within brackets denote variables. Upon determining that the received email is an OOF message, the automatic summarizer can be configured to extract a value for the [sender] by, for instance, recognizing a name (e.g., "Anand") in the "From" field in a header of the received email. The automatic summarizer can also be configured to recognize a first date/time (e.g., "Dec. 11, 2018") and a second date/time (e.g., "Dec. 31, 2018") based on, for instance, formatting of text in the received email. The automatic summarizer can be configured to then compose the summary by substituting the recognized sender and date/times into the summary template as "Anand is OOF from Dec. 11, 2018 to Dec. 31, 2018."

When determined that the received email is not a templated message, the automatic summarizer can be configured to perform a second stage of summarization processing based at least on content in an email body of the received email. In one example implementation, the automatic summarizer can be configured to initially extract entity values (e.g., a sender name, recipient name(s), date/time of transmission/reception, etc.) and text or other suitable types of content from the email body. The automatic summarizer can be configured to then decompose the content from the email body based on one or more machine learning models to classify individual sentences (or portions thereof) into different categories of statements. In certain embodiments, example categories of statements can include facts, inferences, judgements, and decisions. For instance, a statement of fact can be a statement that "Our system crashed last night." A statement of inference can be "There must be a bug in the code." A statement of judgement can be "Our system is the worst," and a statement of decision can be "Please contact the dev team to fix it asap." In other embodiments, the automatic summarizer can also classify emails as truth, evidence, deduction, request, or other suitable types of categories.

A classification developer can be configured to generate the one or more machine learning models by analyzing a set of emails of the user using a "neural network" or "artificial neural network" configured to "learn" or progressively improve performance of tasks by studying known examples. In certain implementations, a neural network can include multiple layers of objects generally refers to as "neurons" or "artificial neurons." Each neuron can be configured to perform a function, such as a non-linear activation function, based on one or more inputs via corresponding connections. Artificial neurons and connections typically have a contribution value that adjusts as learning proceeds. The contribution value increases or decreases a strength of an input at a connection. Typically, artificial neurons are organized in layers. Different layers may perform different kinds of transformations on respective inputs. Signals typically travel from an input layer, to an output layer, possibly after traversing one or more intermediate layers. Thus, by using a neural network, the classification developer can provide a set of classification models that can be used by the automatic summarizer to classify statements in the received email.

Upon completion of decomposing content in the email body of the received email, the automatic summarizer can be configured to assign a relevance score to each classified statement based on an entity making the statement, recency of the statement, and/or other suitable criteria. For example, the automatic summarizer can be configured to determine a relevance score of a statement made by a person based on his/her position in an organization by consulting an organizational chart, a title of the person, etc. As such, a statement made by a manager can have a higher relevance score than those made by his/her subordinates. In other examples, the automatic summarizer can be configured to assign a higher relevance score to a statement that was made more recently than another that was made awhile back. In additional examples, the automatic summarizer can be configured to assign the relevant scores based on subject matter of the statements or other suitable criteria.

The automatic summarizer can also be configured to determine a context of the statements of fact, inference, judgement, and decision by clustering the statements based on, for example, a relative proximity of the statements according to a hierarchy of categories. For example, statements of fact, inference, and judgement proximate to a decision can be clustered around the decision while other statements of fact, inference, and judgement proximate to another decision can be clustered around the other decision. In certain embodiments, the proximity can be based on a preset proximity threshold, for instance, a number of characters, words, sentences, etc. In other embodiments, the proximity threshold can be based on syntax structures, such as punctuations, paragraphs, sections, etc. In further embodiments, the proximity threshold can be based on other suitable criteria.

Under certain scenarios, the received email may not contain any statement classified as a decision. Under such scenarios, embodiments of the disclosed technology can include clustering statements in the received email according to a hierarchy of categories from decision, judgement, inference, to fact. For example, when no statement of decision is present in the received email, the clustering can be performed around one or more statements of judgement. When no statement of decision or judgement is present, the clustering can be performed around one or more statements of inference. When the received email only contains statements of fact, the automatic summarization can be based on the individual facts.

Once the statements are clustered, the automatic summarizer can be configured to calculate a cluster score based on the assigned relevance scores of the individual statements in each cluster. In one example, a cluster score can be a sum of all relevance scores assigned to statements belonging to the cluster. In another example, the cluster score can be a sum of all relevance scores assigned to statements belonging to the cluster and is biased based on an age of the statements, a number of recipients the statements are directed to, or other suitable parameters of the individual statements. In any of the foregoing examples, the calculated cluster scores can be normalized based on a scale of, for instance, zero to one hundred or other suitable value ranges.

Based on the calculated cluster scores, the automatic summarizer can be configured to select a number (e.g., one, two, three, etc.) of clusters based on the calculated cluster scores and apply extractive and/or abstractive techniques to generate the number of suggested summaries of the received email. In certain embodiments, the generated summaries can be outputted, e.g., via a user interface, for selection by the user as a subject or summary of the received email. In other embodiments, the generated summary with the highest cluster score can be automatically selected for output to the user, for example, via a text-to-speech engine to convert the generated summary into a voice message. The voice message can then be played to the user via, for instance, a smartphone or other suitable types of computing device.

Several embodiments of the disclosed technology can thus efficiently perform automatic summarization of content in emails and other types of electronic messages via the foregoing classification technique. Without being bound by theory, it is believed that clustering statements according to the hierarchy of decision, judgement, inference, and fact in the received email can effectively capture major topics contained in the received email. In addition, by considering the dynamic nature of emails and other types of electronic messages and sources of the various statements, relevant subject matter contained in the received email can be accurately captured and surfaced to users. As such, user experience of the automatic summarization application and/or service can be improved when compared to other techniques.

DETAILED DESCRIPTION

Figure 1A:
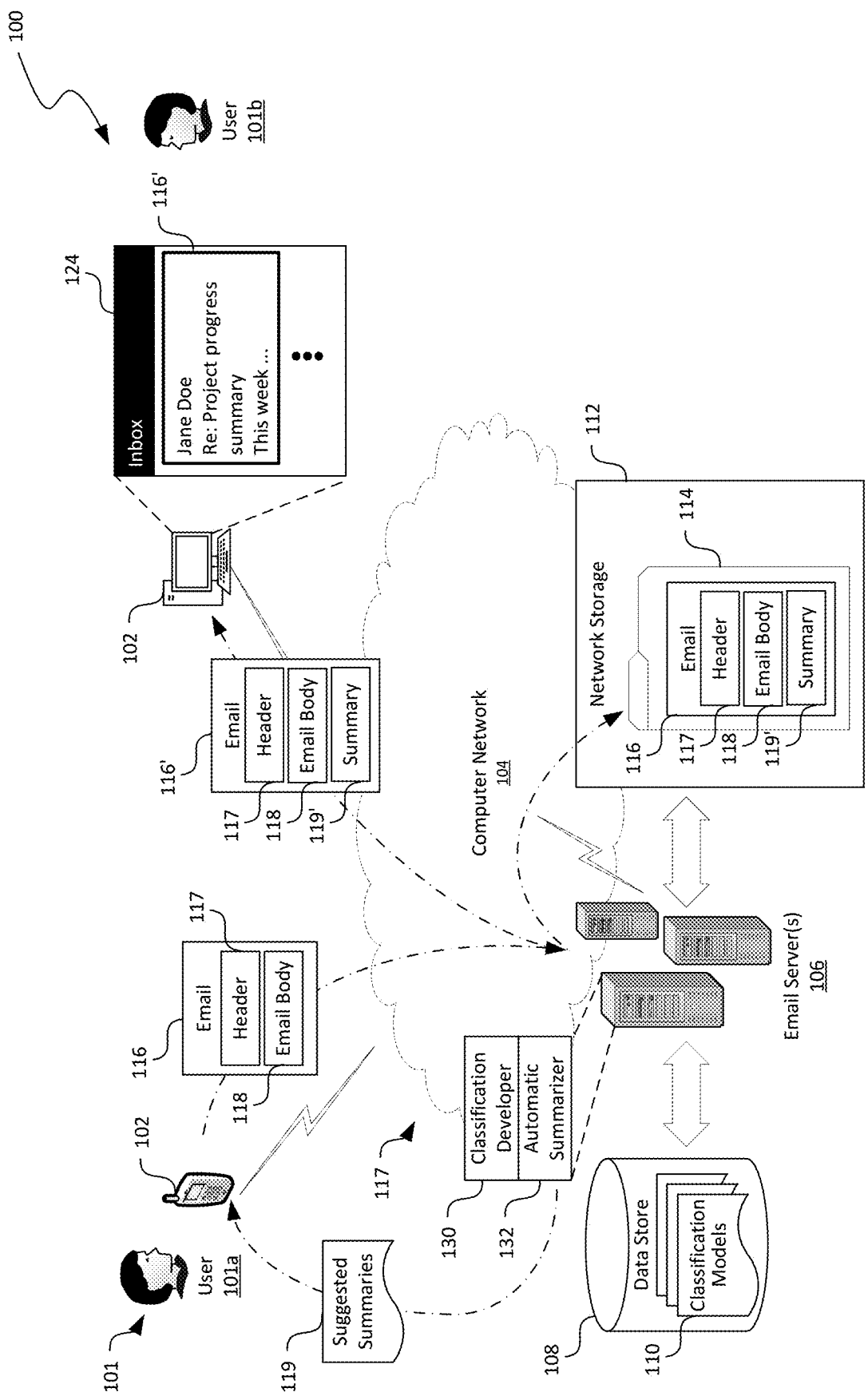
FIGS. 1A and 1B are schematic diagrams illustrating a computing system implementing automatic summarization of content in electronic messages in accordance with embodiments of the disclosed technology.

Certain embodiments of systems, devices, components, modules, routines, data structures, and processes for automatic summarization of content in electronic messages in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

As used herein, the term "email server" generally refers to computer dedicated to running such applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more inboxes for corresponding users. As used herein, an "inbox"

is a file folder configured to contain data representing incoming emails for a user. The email server can also maintain and/or access one or more draft folders and/or outboxes configured to store outgoing emails and/or other suitable mailboxes.

Also used herein, a "fact" generally refers to a statement containing information presented as having objective reality. For instance, an example fact can be a statement that "Our system crashed last night." An "inference" generally refers to a statement containing a deduced opinion that is formed because of known facts or evidence. An example inference can be "There must be a bug in the code." A "judgement" generally refers to a statement containing an utterance of an authoritative opinion. An example judgement can be "Our system is the worst." A "decision" generally refers to a statement containing a call to action and/or determination arrived at and/or after consideration. An example decision can be "Please contact the dev team to fix it asap."

Techniques of extraction and abstraction may be adequate for automatically summarizing text in news stories, scientific papers, etc., such techniques can be insufficient for summarizing content of electronic messages (e.g., emails) exchanged between users. One reason for such insufficiency is that status of content in emails can change over time. For example, a statement directed toward an early event may not be as relevant now as then. Another reason can be that relevance of content in emails can depend on a context of corresponding email communication. For example, a short statement from a manager in an organization can be more relevant than multiple long statements made by his/her subordinates.

Several embodiments of the disclosed technology are directed to implementing context-based automatic summarization to efficiently perform automatic summarization of content in electronic messages. In particular, aspects of the disclosed technology are directed to classifying individual sentences (or portions thereof) in an email body into different categories of statements such as facts, inferences, judgements, and decisions. Relevance scores can then be assigned to the individual statements before the classified statements are clustered according to a hierarchy of decision, judgement, inference, and fact. Cluster scores can then be calculated for the individual clusters. Based on the cluster scores, one or more clusters of statements can be selected to generate suitable summaries and/or subjects for the electronic messages, as described in more detail below with reference to FIGS. 1A-5.

FIG. 1A is a schematic diagram illustrating a computing system 100 implementing automatic summarization of content in electronic messages in accordance with embodiments of the disclosed technology. As shown in FIG. 1A, the computing system 100 can include a computer network 104 interconnecting client devices 102 and one or more email servers 106 (referred to as "email server 106" here in for simplicity). The email server 106 is also interconnected with a network storage 112 containing one or more inboxes 114 and a data store 108 containing classification indicators 110. The computer network 104 can include an intranet, a wide area network, the Internet, or other suitable types of network. Even though particular components of the computing system 100 are shown in FIG. 1A, in other embodiments, the computing system 100 can also include additional and/or different components or arrangements. For example, the computing system 100 can also include additional network storage devices, additional hosts, and/or other suitable components (not shown). In other embodiments, the network storage 112 and/or the data store 108 may be integrated into the email server 106.

The client devices 102 can each include a computing device that facilitates corresponding users 101 to access computing services provided by the email server 106 via the computer network 104. For example, in the illustrated embodiment, the client devices 102 individually include a smartphone and a desktop computer. In other embodiments, the client devices 102 can also include laptops, tablets, gaming consoles, or other suitable computing devices. Even though first and second users 101a and 101b are shown in FIG. 1 for illustration purposes, in other embodiments, the computing system 100 can facilitate any suitable number of users 101 to access suitable types of computing services provided by the email server 106.

The email server 106 can be configured to facilitate email reception, storage, forwarding, and other related functionalities. For example, as shown in FIG. 1A, the first user 101a can utilize the client device 102 to generate and transmit an email 116 to the email server 106 either directly or via other intermediate email servers (not shown). The email 116 is destined to the second user 101b and can include an email header 117, an email body 118, and one or more optional attachments (not shown). The email header 117 can include various fields such as "From:," "To:," "Cc:," "Bcc:," etc. The email body 118 can include text arranged in sentences, paragraphs, section, etc., and/or other suitable types of content. Upon receiving the email 116 from the first user 101a, the email server 106 can store a copy of the email 116 in an inbox 114 on the network storage 112 that correspond to the second user 101b.

As shown in FIG. 1A, the computing system 100 can include a classification developer 130 and an automatic summarizer 132 operatively coupled to each other for automatically summarizing content of emails 116 exchanged between the first and second users 101a and 101b. In the illustrated example in FIG. 1A, the classification developer 130 and the automatic summarizer 132 are components of the email server 106. In other examples, at least one of the classification developer 130/or the automatic summarizer 132 can be a component hosted on one or more additional servers (not shown) separate from the email server 106 while still having access to the email 116 in the inbox 114 at the network storage 112.

In accordance with embodiments of the disclosed technology, the classification developer 130 can be configured to develop one or more classification models 110 that are useful for classifying statements in the email 116 via machine learning. For example, the classification developer 130 can be configured to generate the one or more classification models 110 by analyzing a set of emails of the users 101 using a "neural network" or "artificial neural network" configured to "learn" or progressively improve performance of tasks by studying known examples. In certain implementations, a neural network can include multiple layers of objects generally refers to as "neurons" or "artificial neurons." Each neuron can be configured to perform a function, such as a non-linear activation function, based on one or more inputs via corresponding connections. Artificial neurons and connections typically have a weight value that adjusts as learning proceeds. The weight value increases or decreases a strength of an input at a connection. Typically, artificial neurons are organized in layers. Different layers may perform different kinds of transformations on respective inputs. Signals typically travel from an input layer, to an output layer, possibly after traversing one or more intermediate layers. Thus, by using a neural network, the classification developer 130 can provide the one or more classification models that can be used by the automatic summarizer 132 to classify statements in the received email 116.

The automatic summarizer 132 can be configured to utilize the classification models 110 to generate suggested summaries 119 of content in the email 116. The automatic summarizer 132 can then provide the suggested summaries 119 to the first user 101a for selection. The first user 101a can then select a summary 119' from the suggested summaries 119. In response the selection, the automatic summarizer 132 (or other suitable components of the email server 106) can be configured to insert the selected summary 119' into the received email 116 before transmitting the email 116' to the second user 101b.

As shown in FIG. 1A, upon receiving the email 116', an email client 124 on the client device 102 can display the received email 116' as a message in an inbox of the second user 101b. For instance, the example email 116' can include a header 117 containing a sender's name (i.e., "Jane Doe"), a subject line containing the selected summary 119' (e.g., "Project progress summary"), and an email body 118 containing example text such as "This week . . . "). Thus, the first user 101a can efficiently compose the email 116 to the second user 101b with the automatically generated summary 119'. As such, usability of the email service provided by the email server 106 can be improved even when the first user 101a is composing the email 116 using voice-to-text conversion, or otherwise without access to readily available typing facilities.

In certain embodiments, the automatic summarizer 132 can be configured to perform first and second stages of summarization processing on the received email 116. The first stage of summarization processing can include a template-based processing stage. The second stage of summarization processing can include classifying statements in the email body 118 based on the classification models 110, clustering classified statements according to categories, calculating cluster scores, and selecting clusters for automatically generating the suggested summaries 119 for selection by the first user 101. Example components and operations of the automatic summarizer 132 are described in more detail below with reference to FIG. 2.

Figure 1B:
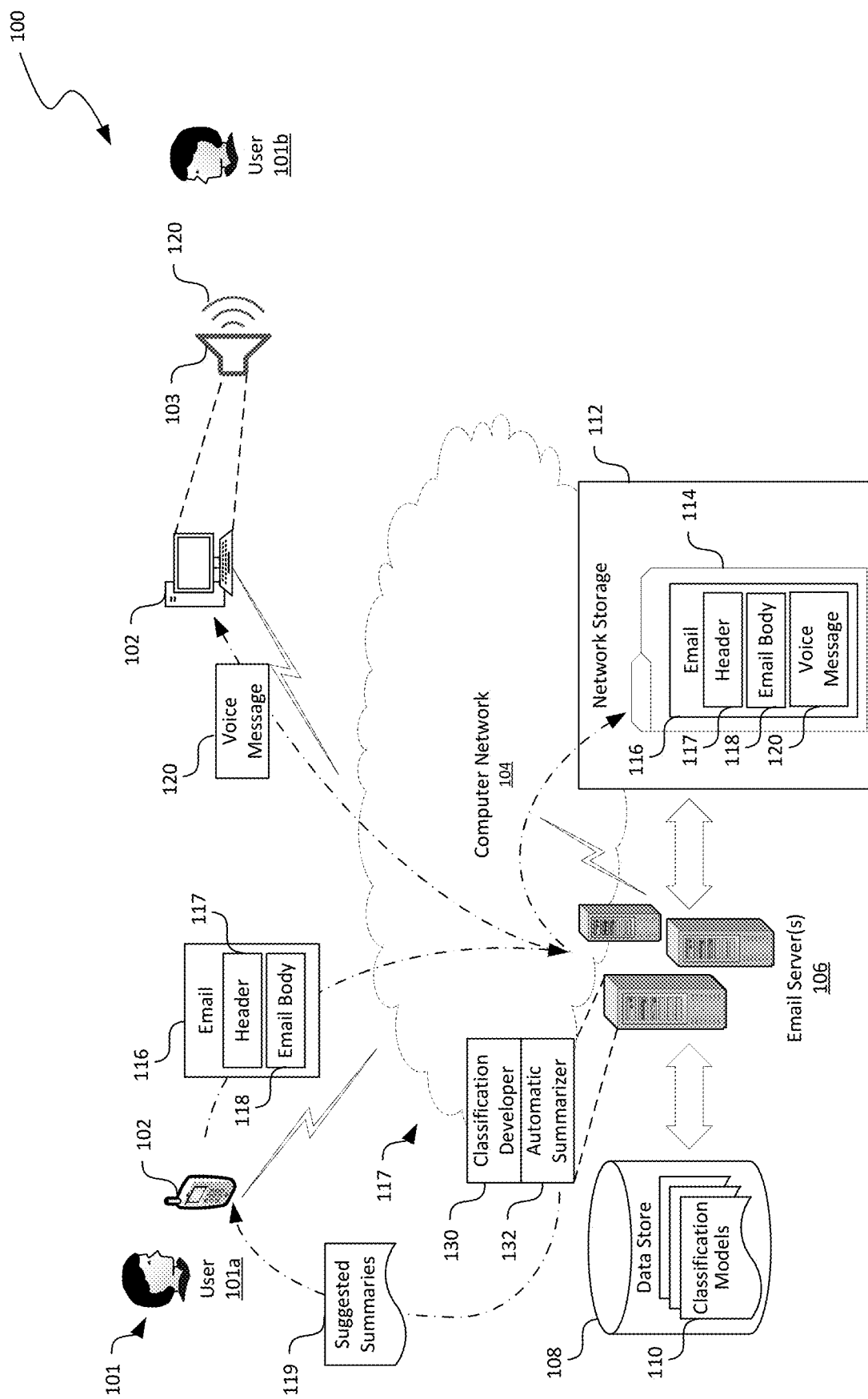

In other embodiments, the automatic summarizer 132 can also be configured to perform other suitable operations. For example, as shown in FIG. 1B, in response to selection by the first user 101a, the automatic summarizer 132 can also be configured to convert the selected summary 119' (FIG. 1A) into a voice message 120 and store the voice message 120 in the inbox 114 of the second user 101b in the network storage 112. Upon request by the second user 101b or in other suitable manners, the email server 106 can be configured to provide the generated voice message 120 to the client device 102 of the second user 101b. In turn, the client device 102 can be configured to play the voice message 120 containing the selected summary 119' to the second user 101b via, for instance, a speaker 103.

Figure 2:
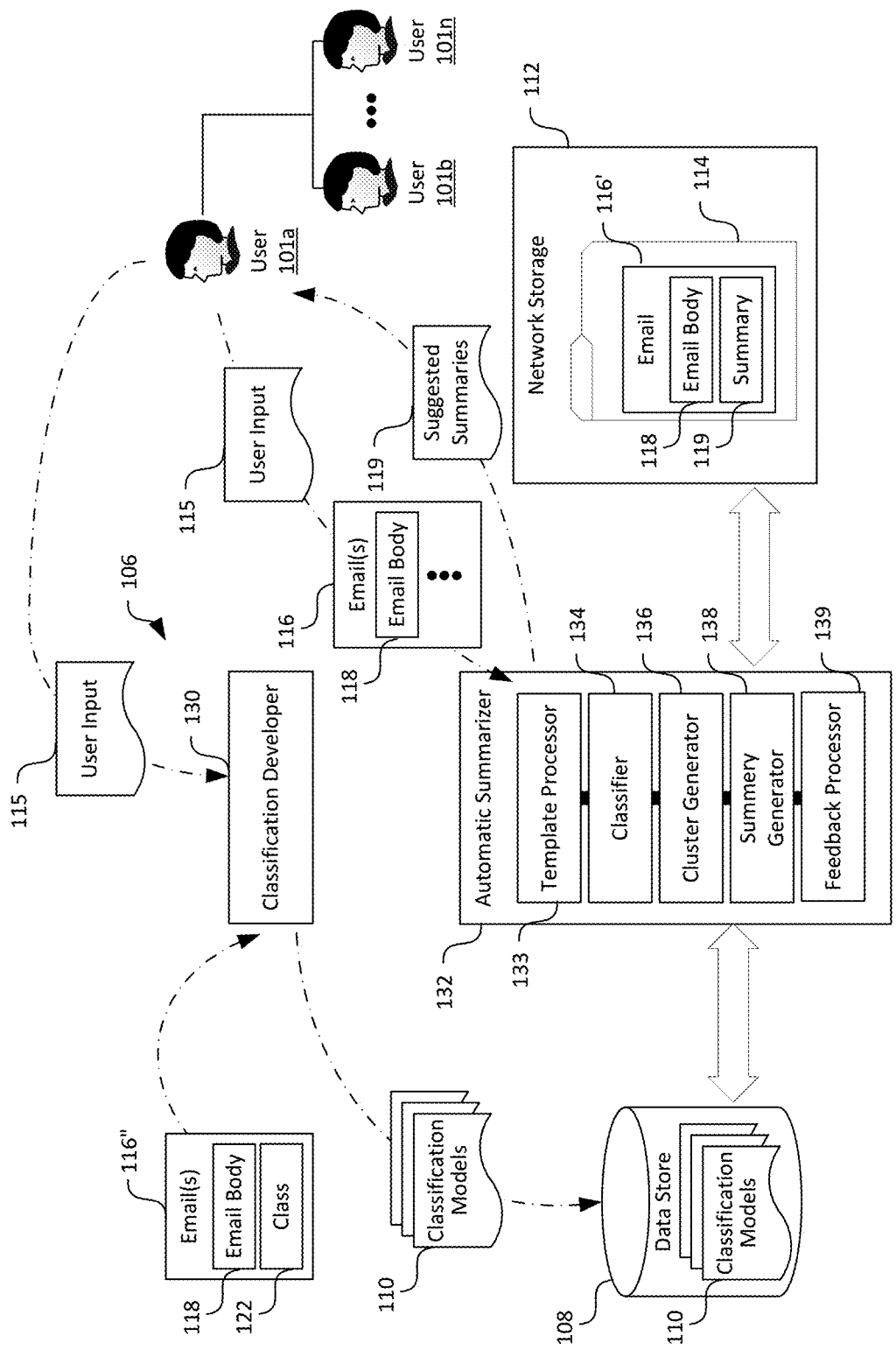
FIG. 2 is a schematic diagram illustrating certain hardware/software components of the computing system of FIG. 1 in accordance with embodiments of the disclosed technology.

FIG. 2 is a schematic diagram illustrating certain hardware/software components of the computing system 100 in accordance with embodiments of the disclosed technology. In FIG. 2, only certain components of the computing system 100 of FIG. 1 are shown for clarity. In FIG. 2 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the email server 106 can include a classification developer 130 and an automatic summarizer 132. Though the classification developer 130 and the automatic summarizer 132 are shown as components of the email server 106 in FIG. 2, in other embodiments, the classification developer 130 can be provided by one or more other online or offline servers (not shown) separate from the email server 106. In further embodiments, the email server 106 can include additional and/or different components not shown in FIG. 2.

The classification developer 130 can be configured to generate the classification models 110 via various machine learning techniques based on a dataset containing previous emails 116" and associated statement classes 122 and user input 115 regarding suggested summaries. The statement classes 122 can be manually generated, automatically generated via unstructured learning, or via other suitable techniques. In one implementation, the classification developer 130 can be configured to use a neural network that includes multiple layers of objects generally refers to as "neurons" or "artificial neurons" to perform machine learning based on the dataset of emails 116," as described above with reference to FIG. 1A. By using the neural network, the classification developer 130 can provide a set of classification models 110 that can be used by the automatic summarizer 132 for classifying additional received emails 116. In one example, the classification models 110 can include various values of variables related to the email body 118. Example variables can include keywords or key phrases (e.g., "probably," "must have been," etc.), syntax (e.g., verb before nouns and adjectives), sentence structures (e.g., subject followed by a verb and a noun), and other suitable content parameters. As such, one example classification model 110 can include an indication of a decision conditioned on a sentence having a verb before any nouns (e.g., "Please contact the dev team to fix it asap"). In other examples, the classification models 110 can have other suitable conditions and indications. In the illustrated embodiment, the classification developer 130 provides the classification models 110 to be stored at the data store 108. In other embodiments, the classification developer 130 can provide the classification models 110 directly to the automatic summarizer 132 or store the classification models 110 in other suitable locations.

As shown in FIG. 2, the automatic summarizer 132 can include a template processor 133, a classifier 134, a cluster generator 136, a summary generator 138, and a feedback processor 139 operative coupled to one another. Though particular component or modules of the automatic summarizer 132 are shown in FIG. 2 for illustration purposes, in other embodiments, the automatic summarizer 132 can also include interface, network, or other suitable types of components and/or modules. In further embodiments, at least one of the foregoing components can be provided by an external application/server separate from the automatic summarizer 132.

In certain embodiments, at a first stage of summarization processing, the template processor 133 of the automatic summarizer can be configured to determine whether the received email 116 from the first user 101a is a templated message. Without being bound by theory, it is believed that emails exchanged in enterprises, government offices, schools, or other suitable types of organizations can often be templated messages. Example templated messages can include messages related to out of office (OOF), personal leave, work from home (WFH), meeting invitation, automated response, status update, welcome remark, meeting memo, etc. In one implementation, the template processor 133 can be configured to detect such templated messages via machine learning using, for instance, a training dataset having the emails 116". In other implementations, the template processor 133 can also be configured to detect such templated messages using pre-configured message templates provided by administrator (not shown), or via other suitable techniques.

The template processor 133 can be configured to efficiently summarize the templated messages using pre-configured summary templates. For instance, a summary template for an OOF message can include "[sender] is OOF from [Date/Time1] to [Date/time2]" in which parameters (e.g., "sender") within brackets denote variables. Upon determining that the received email is an OOF message, the template processor 133 can be configured to extract a value for the [sender] by, for instance, recognizing a name (e.g., "Anand") in the "From" field in a header of the received email. The template processor 133 can also be configured to recognize a first date/time (e.g., "Dec. 11, 2018") and a second date/time (e.g., "Dec. 31, 2018") based on, for instance, formatting of text in the received email 116. The template processor 133 can be configured to then compose the summary 119 by substituting the recognized sender and date/times into the summary template as "Anand is OOF from Dec. 11, 2018 to Dec. 31, 2018."

When determined that the received email 116 is not a templated message, the template processor 133 can be configured to forward processing to the classifier 134 to perform a second stage of summarization processing based at least on content in an email body 118 of the received email 116. In one example implementation, the classifier 134 can be configured to initially extract entity values (e.g., a sender name, recipient name(s), date/time of transmission/reception, etc.) and text or other suitable types of content from the email body 118. The classifier 134 can be configured to then decompose the content from the email body 118 based on the one or more classification models 110 from the data store 108 to classify individual sentences (or portions thereof) in the email body 118 into different categories of statements. In certain embodiments, example categories of statements can include facts, inferences, judgements, and decisions. For instance, a statement of fact can be a statement that "Our system crashed last night." A statement of inference can be "There must be a bug in the code." A statement of judgement can be "Our system is the worst," and a statement of decision can be "Please contact the dev team to fix it asap." In other embodiments, the automatic summarizer can also classify emails as truth, evidence, deduction, request, or other suitable types of categories.

Upon completion of decomposing content in the email body 118 of the received email 116, the classifier 134 can be configured to assign a relevance score to each classified statement based on an entity making the statement, recency of the statement, and/or other suitable criteria. For example, the classifier 134 can be configured to determine a relevance score of a statement made by a person based on his/her position in an organization by consulting an organizational chart, a title of the person, etc. As such, a statement made by a manager can have a higher relevance score than those made by his/her subordinates. For instance, in the example shown in FIG. 2, statements by the second user 101b and other users 101n shown as subordinates to the first user 101a would have a lower relevance score than those made by the first user 101a. In other examples, the classifier 134 can be configured to assign a higher relevance score to a statement that was made more recently than another that was made awhile back. In additional examples, the classifier 134 can be configured to assign the relevant scores based on subject matter of the statements or other suitable criteria.

The automatic summarizer 132 can also be configured to determine a context of the statements of fact, inference, judgement, and decision by using the cluster generator 136 to cluster the statements based on, for example, a relative proximity of the statements according to a hierarchy of categories. For example, statements of fact, inference, and judgement proximate to a decision can be clustered around the decision while other statements of fact, inference, and judgement proximate to another decision can be clustered around the other decision. In certain embodiments, the proximity can be based on a preset proximity threshold, for instance, a number of characters, words, sentences, etc. In other embodiments, the proximity threshold can be based on syntax structures, such as punctuations, paragraphs, sections, etc. In further embodiments, the proximity threshold can be based on other suitable criteria.

Under certain scenarios, the received email may not contain any statement classified as a decision. Under such scenarios, the cluster generator 136 can be configured to cluster statements in the received email 116 according to a hierarchy of categories from decision, judgement, inference, to fact. For example, when no statement of decision is present in the received email, the clustering can be performed around one or more statements of judgement. When no statement of decision or judgement is present, the clustering can be performed around one or more statements of inference. When the received email only contains statements of fact, the automatic summarization can be based on the individual facts. Example clusters 140 (shown in FIGS. 3A-3C) are described in more detail below with reference to FIGS. 3A-3C.

Once the statements are clustered, the cluster generator 136 can be configured to calculate a cluster score for the individual clusters 140 based on the assigned relevance scores of the individual statements in each cluster. In one example, a cluster score can be a sum of all relevance scores assigned to statements belonging to the cluster. In another example, the cluster score can be a sum of all relevance scores assigned to statements belonging to the cluster and is biased based on an age of the statements, a number of recipients the statements are directed to, or other suitable parameters of the individual statements. In any of the foregoing examples, the calculated cluster scores can be normalized based on a scale of, for instance, zero to one hundred or other suitable value ranges.

Based on the calculated cluster scores, the cluster generator 136 can be configured to rank and select a number (e.g., one, two, three, etc.) of clusters 140 based on the calculated cluster scores (or other suitable criteria) and forward the selected clusters 140 to the summary generator 138 for further processing. The summary generator 138 can be configured to apply extractive and/or abstractive techniques to generate the number of suggested summaries 119 of the received email 116. In certain embodiments, the generated summaries 119 can be outputted, e.g., via a user interface (not shown), for selection by the user as a subject or summary of the received email 116. In other embodiments, the generated summary 119 with the highest cluster score can be automatically selected for output to the first user 101a, for example, via a text-to-speech engine to convert the generated summary into a voice message 120 (shown in FIG. 1B). The voice message 120 can then be played to the user 101 via, for instance, a smartphone or other suitable types of computing device. In further embodiments, upon selection of one of the suggested summaries 119 by the user 101, the summary generator 138 can insert the selected summary 119 into the email 116 stored at the inbox 114 at the network storage 112. In certain implementations, the feedback processor 139 can be configured to receive the user input 115 regarding relevance of the suggested summaries 119. In response to receiving the user input 115, the classifier 134 can be configured to reassign relevance scores to each classified statements; the summary generator 138 can regenerate the suggested summaries, or perform other suitable operations in the automatic summarizer 132.

Several embodiments of the disclosed technology can thus efficiently perform automatic summarization of content in emails 116 and other types of electronic messages via the foregoing classification technique. Without being bound by theory, it is believed that clustering statements according to the hierarchy of decision, judgement, inference, and fact in the received email 116 can effectively capture major topics contained in the received email. In addition, by considering the dynamic nature of emails 116 and other types of electronic messages and sources of the various statements, relevant subject matter contained in the received email can be accurately captured and surfaced to users. For example, the generated summaries can be changed as new conversations are added, new users 101 are added or removed. The generated summary based on the same emails can also vary based on who is looking for the generated summary. For instance, a manager's view of the generated summary can be different from that of any subordinates of the manager. As such, user experience of the automatic summarization application and/or service can be improved when compared to other techniques.

Figure 3A:
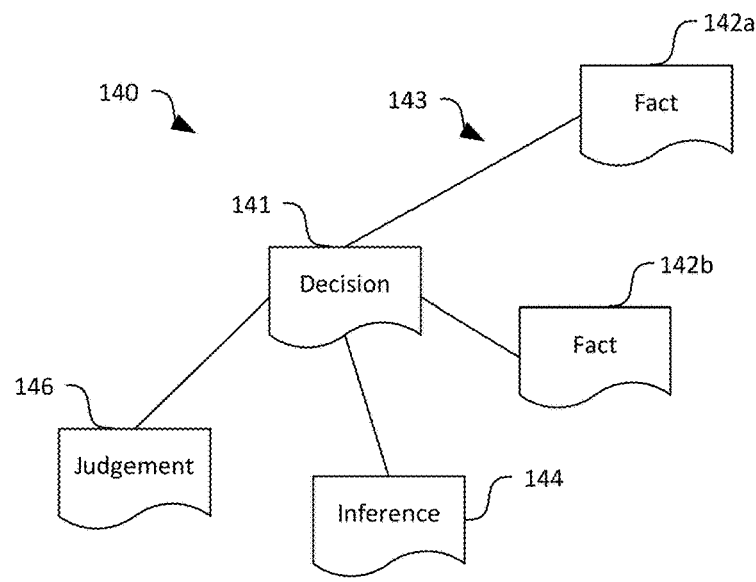
FIGS. 3A-3C are schematic diagrams illustrating statement clustering in accordance with embodiments of the disclosed technology.
Figure 3B:
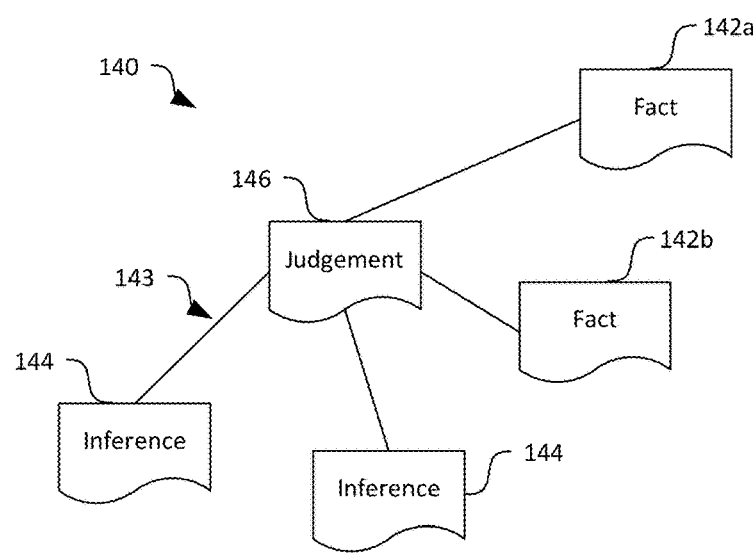
Figure 3C:
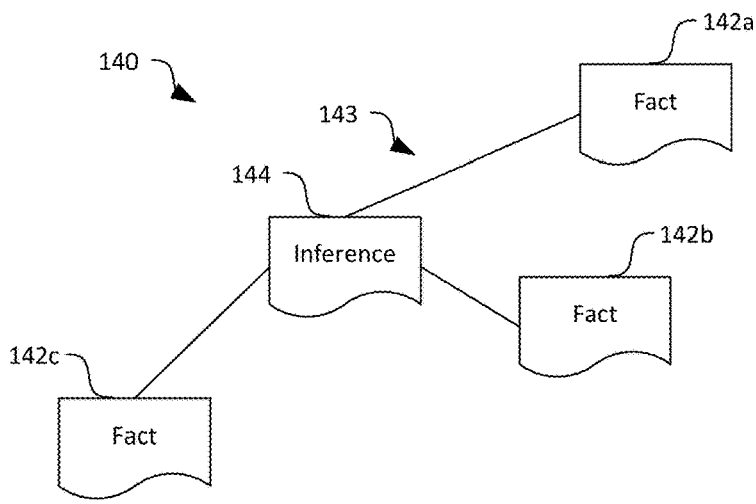

FIGS. 3A-3C are schematic diagrams illustrating statement clustering in accordance with embodiments of the disclosed technology. As shown in FIG. 3A, a cluster 140 can include a decision 141 and one or more facts 142a and 142b, inferences 144, and judgements 146 associated with the decision 141, as represented by the edges 143. As described above with reference to FIG. 1A, when an email body 118 does not include any decisions 141, the cluster 140 can be generated based on a judgement 146, as shown in FIG. 3B. When an email body 118 does not include any decisions 141 or judgement 146, the cluster 140 can be generated based on an inference 144, as shown in FIG. 3C. Though particular numbers of decisions, judgements, inferences, and facts are shown in FIGS. 3A-3C for illustration purposes, in other examples, each cluster 140 can include one of a decision, judgement, or inference surrounded by any suitable numbers of other categories of statements.

Figure 4A:
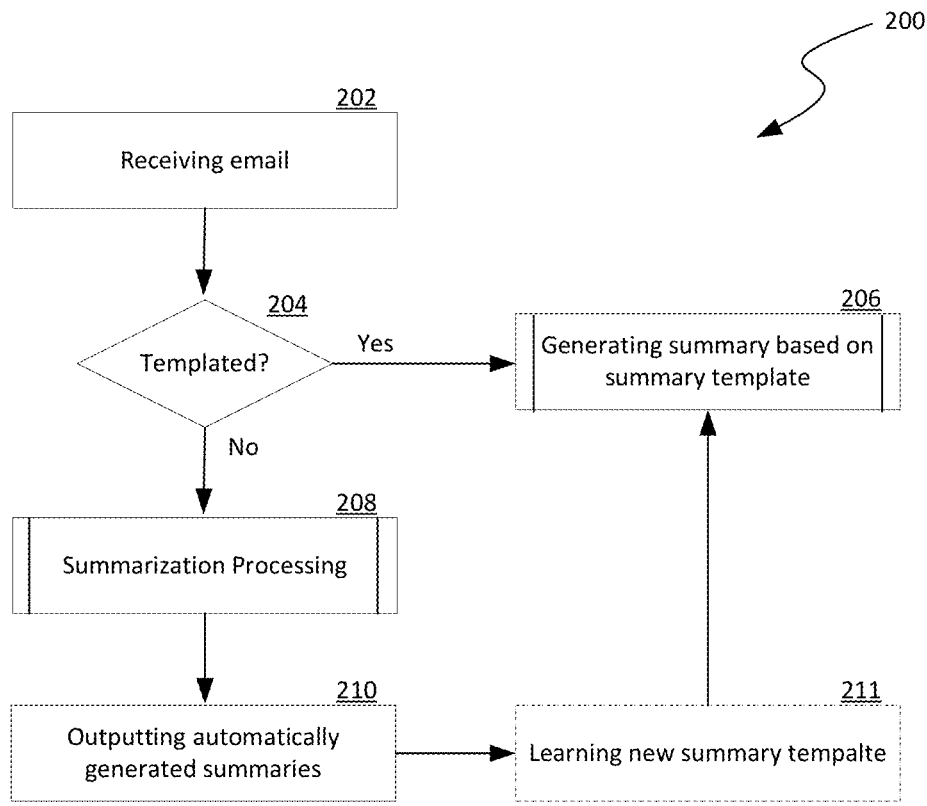
FIGS. 4A-4C are flowcharts illustrating example processes of automatic summarization of content in electronic messages in accordance with embodiments of the disclosed technology.
Figure 4B:
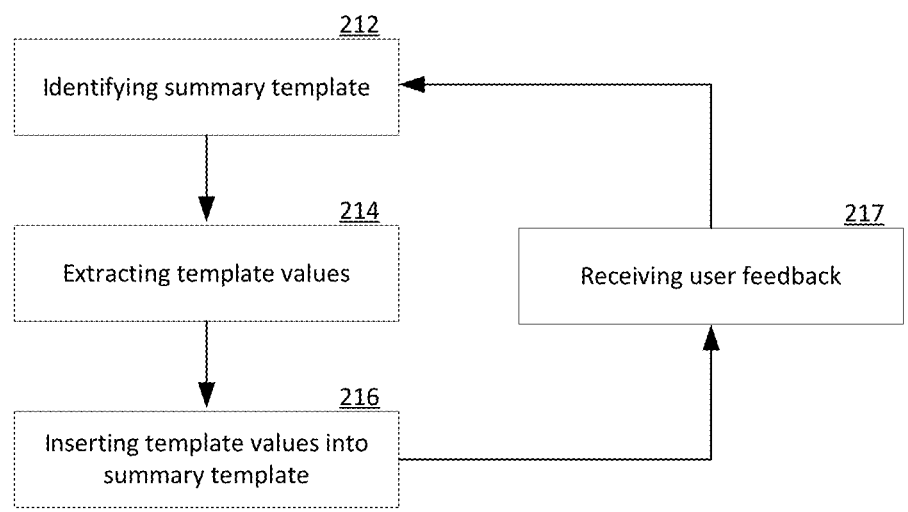
Figure 4C:
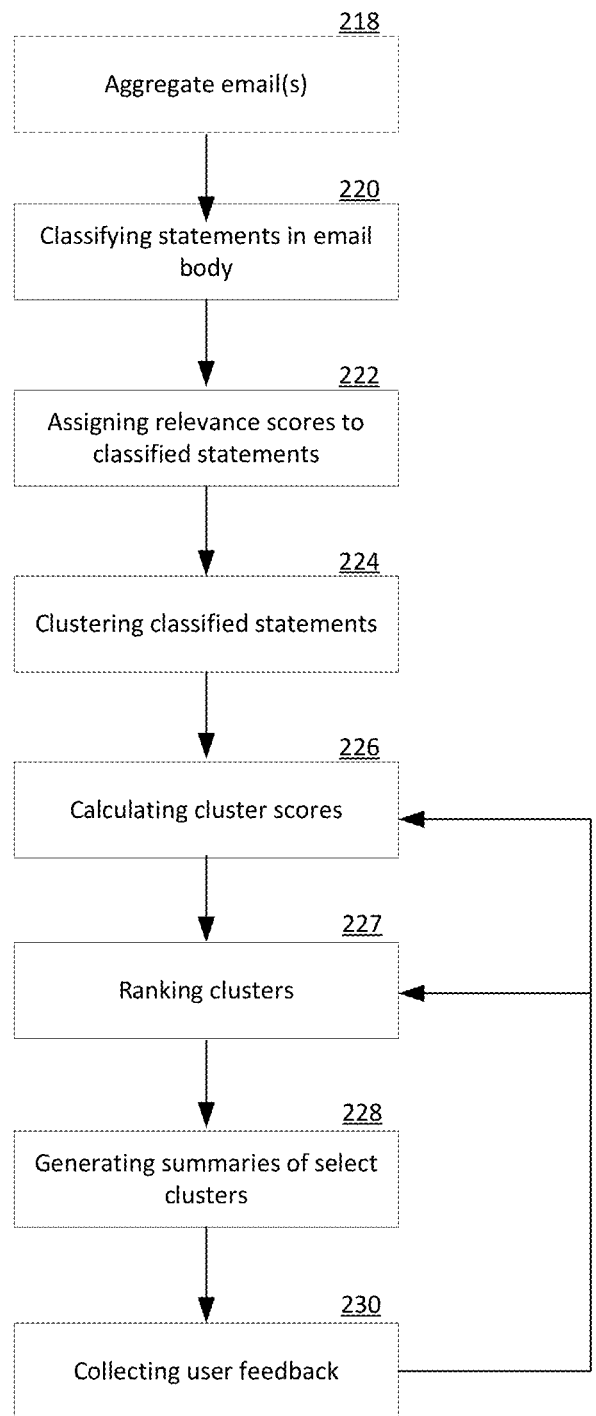

FIGS. 4A-4C are flowcharts illustrating example processes of automatic summarization of content in electronic messages in accordance with embodiments of the disclosed technology. Even though the processes are described below with reference to the computing system 100 of FIGS. 1A and 1B, in other embodiments, the processes can also be implemented in computing systems with additional and/or different components.

As shown in FIG. 4A, a process 200 can include receiving an email at stage 202. The process 200 can then include a decision stage 204 to determine whether the received email is a templated message. In one embodiment, the determination can be based on template models developed using machine learning. In other embodiments, the determination can also be based on message templates provided by, for example, an administer or other suitable entities. In response to determining that the received email is a templated message, the process 200 can proceed to generating a summary of the received email based on a summary template at stage 206. In some embodiments, generating the summary can include identifying entity specific summary templates. For instance, a sales department may have different summary templates than a finance department. Example operations of generating a summary based on a summary template are described in more detail below with reference to FIG. 4B. In response to determining that the received email is not a templated message, the process 200 can proceed to performing a classification based summarization processing at stage 208. Example operations of performing a classification based summarization processing are described in more detail below with reference to FIG. 4C. The process 200 can further optionally include learning new summary templates at stage 211. The new summary templates can be based on the generated summaries from stage 210 or from other suitable sources. The new summary templates can then be used in generating summary based on summary templates in stage 206.

As shown in FIG. 4B, the example operations of generating a summary based on a summary template can include identifying a summary template corresponding to the received email at stage 212. In certain embodiments, identifying the summary template can include determining whether any user or entity specific template exists. In response to determining that a user or template entity exists. If a user or entity summary template exists, the operations can identify and/or select the user or entity specific summary template. Otherwise, the operations can include identifying or selecting a generic summary template. The operations can then include extracting template values from the received email at stage 214. Example extracted template values can include a sender's name, a date/time, a location, or other suitable information. The operations can then include inserting the extracted template values into the identified summary template to generate a summary of the email at stage 216. In certain implementations, the summary template can be user profile based. For example, an email can be identified to correspond to a template "Leave Application." If a user has certain way of providing the subject line of the email, generating the summary can include generating a summary using the subject line construct the user used in the email. The operations can also include receiving user feedback on the generated summary at stage 217. Based on the received user feedback, the operations can include designating the identified summary template at stage 212 as a user or entity specific summary template or perform other suitable operations to explore new user or entity specific summary templates.

As shown in FIG. 4C, example operations of performing a classification based summarization processing can include an optional stage of aggregating emails based on topics or other suitable attributes at stage 218. For example, emails with similar conversations can be grouped together using vectorization or the emails/conversation pieces. The operations can also include classifying statements in an email body at stage 220. Example techniques for classifying statements are described above with reference to FIG. 2. The operations can then include assigning relevance scores to each of the classified statements at stage 222. The operations can then include clustering the classified statements at stage 224. Example clusters are described above with reference to FIGS. 3A-3C. The operations can then include calculating a cluster score for each cluster at stage 226 and ranking the clusters based on one or more of the calculated scores, recency of the emails in the clusters, or a user profile of the authors of the emails in the organization. Such cluster ranking can be used to select top five, three, or other suitable numbers of clusters to be included in a final summary. The operations can further include generating summaries of one or more selected clusters at stage 228, described above with reference to FIG. 2. The operations can also include collecting user feedback at stage 230 regarding the generated summaries. The collected user feedback can then be used to adjust the cluster scores and/or cluster rankings at stages 226 and 227, respectively.

Figure 5:
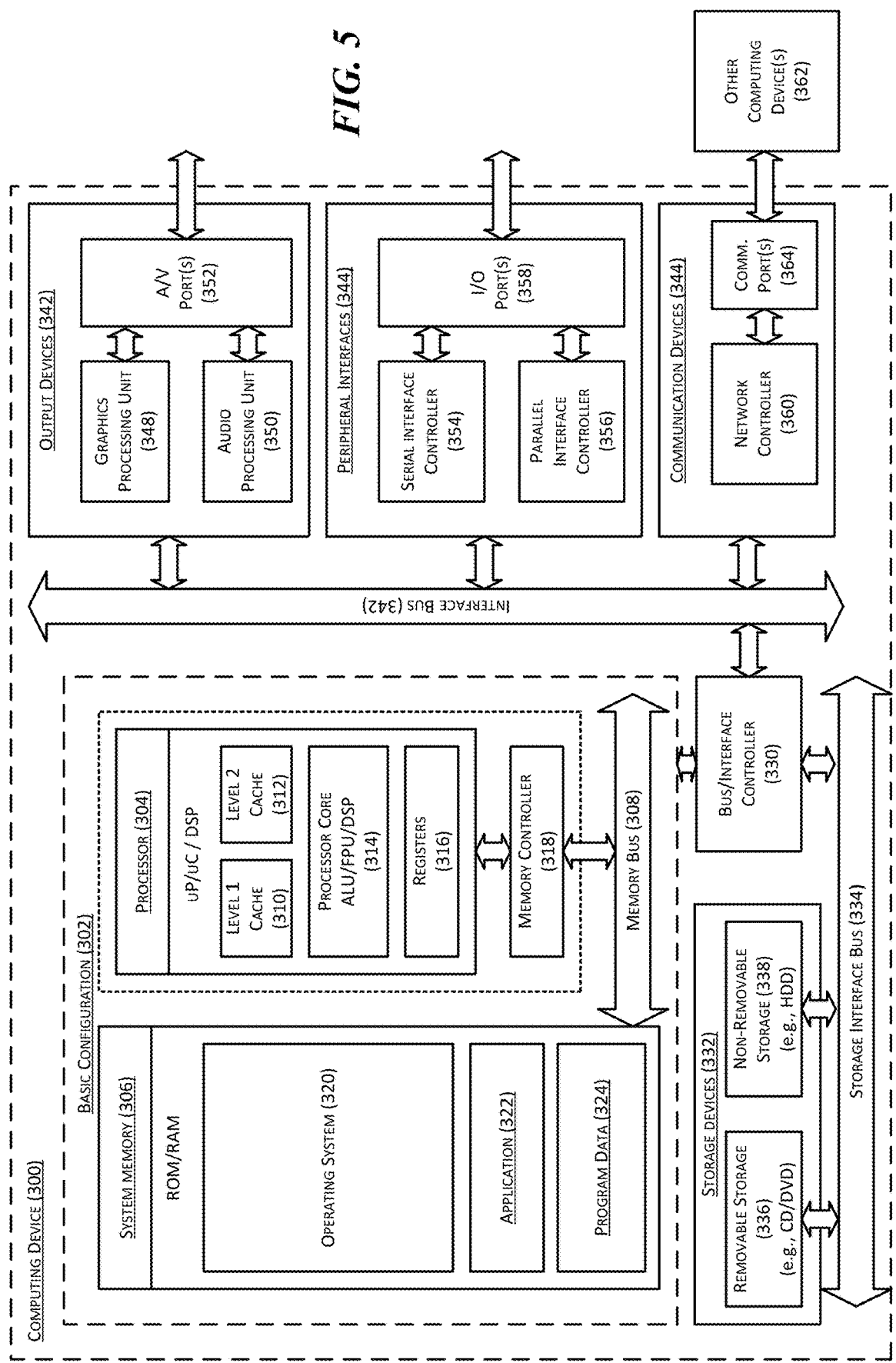
FIG. 5 is a computing device suitable for certain components of the computing system in FIG. 1.

FIG. 5 is a computing device 300 suitable for certain components of the computing system 100 in FIG. 1. For example, the computing device 300 can be suitable for the email server 106 or the client devices 102 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of automatic summarization of content in electronic messages, the method comprising:
   upon receiving, at an email server, an incoming email having an email body having one or more sentences,
      classifying the one or more sentences in the email body individually as a statement of decision, judgement, inference, or fact;
      clustering the classified statements into one or more clusters according to a hierarchy of decision, judgement, inference, and fact;
      selecting one or more of the clusters to automatically generate summaries of the incoming email corresponding to each of the selected clusters; and
      inserting data representing at least one of the generated summaries into the incoming email before transmitting the incoming email to a destination via a computer network.

2. The method of claim 1, further comprising:
   assigning, to each classified statement of decision, judgement, inference, or fact, a relevance score; and
   calculating a cluster score for the individual clusters based on the assigned relevance scores of the statements in each cluster.

3. The method of claim 1, further comprising:
   assigning, to each classified statement of decision, judgement, inference, or fact, a relevance score;
   calculating a cluster score for the individual clusters based on the assigned relevance scores of the statements in each cluster; and
   wherein selecting one or more of the clusters includes selecting one or more of the clusters based on the calculated cluster scores.

4. The method of claim 1, further comprising:
   assigning, to each classified statement of decision, judgement, inference, or fact, a relevance score, wherein the assigned relevance scores are based on at least one of a sender identity of the incoming email or recency of the corresponding statements;
   calculating a cluster score for the individual clusters based on the assigned relevance scores of the statements in each cluster; and
   wherein selecting one or more of the clusters includes selecting one or more of the clusters based on the calculated cluster score.

5. The method of claim 1 wherein clustering the classified statements includes:
   determining whether the classified statements include at least one decision; and
   in response to determining that the classified statements includes at least one decision, generating a cluster around the at least one decision.

6. The method of claim 1 wherein clustering the classified statements includes:
   determining whether the classified statements include at least one decision; and
   in response to determining that the classified statements does not include at least one decision,
      determining whether the classified statements include at least one judgement; and
      in response to determining that the classified statements includes at least one judgement, generating a cluster around the at least one judgment.

7. The method of claim 1 wherein clustering the classified statements includes:
   determining whether the classified statements include at least one decision; and
   in response to determining that the classified statements does not include at least one decision,
      determining whether the classified statements include at least one judgement;
      in response to determining that the classified statements does not include at least one judgement,
         determining whether the classified statements include at least one inference; and
         in response to determining that the classified statements includes at least one inference, generating a cluster around the at least one inference.

8. The method of claim 1, further comprising:
   determining whether the incoming email is a templated message; and
   in response to determining that the incoming email is a templated message,
      identifying a summary template corresponding to the incoming email; and
      generating a summary based on the identified summary template.

9. The method of claim 1 wherein inserting data representing at least one of the generated summaries includes:
   converting the at least one of the generated summaries from text to a voice message; and
   inserting the converted voice message to the incoming email for playback at a client device.

10. A computing device for processing electronic messages, the computing device comprising:
    a processor;
    a memory containing instructions executable by the processor to cause the computing device to:
       receive an incoming email having an email body having multiple sentences,
       determine whether the incoming email is a templated message based on the multiple sentences in the email body; and
       in response to determining that the incoming email is not a templated message, classify the one or more sentences in the email body individually as a statement of decision, judgement, inference, or fact utilizing a classification model;
generate multiple clusters of the classified statements according to a hierarchy of decision, judgement, inference, and fact;
select one of the clusters to automatically generate a summary of the incoming email corresponding to the selected one or the clusters; and
outputting the automatically generated summary to a user as a voice or text message.

11. The computing device of claim 10 wherein the memory includes additional instructions executable by the processor to cause the computing device to:
assign, to each classified statement of decision, judgement, inference, or fact, a relevance score; and
calculate a cluster score for the individual clusters based on the assigned relevance scores of the statements in each cluster.

12. The computing device of claim 10 wherein the memory includes additional instructions executable by the processor to cause the computing device to:
assign, to each classified statement of decision, judgement, inference, or fact, a relevance score;
calculate a cluster score for the individual clusters based on the assigned relevance scores of the statements in each cluster; and
wherein to select one of the clusters includes to select one of the clusters having a highest calculated cluster score.

13. The computing device of claim 10 wherein the memory includes additional instructions executable by the processor to cause the computing device to:
assign, to each classified statement of decision, judgement, inference, or fact, a relevance score, wherein the assigned relevance scores are based on at least one of a sender identity of the incoming email or recency of the corresponding statements;
calculate a cluster score for the individual clusters based on the assigned relevance scores of the statements in each cluster; and
wherein to select one of the clusters includes to select one of the clusters having a highest calculated cluster score.

14. The computing device of claim 10 wherein to cluster the classified statements includes to:
determine whether the classified statements include at least one decision; and
in response to determining that the classified statements includes at least one decision, generate a cluster around the at least one decision.

15. The computing device of claim 10 wherein to cluster the classified statements includes to:
determine whether the classified statements include at least one decision; and
in response to determining that the classified statements does not include at least one decision,
determine whether the classified statements include at least one judgement; and
in response to determining that the classified statements includes at least one judgement, generate a cluster around the at least one judgment.

16. The computing device of claim 10 wherein to cluster the classified statements includes to:
determine whether the classified statements include at least one decision; and
in response to determining that the classified statements does not include at least one decision,
determine whether the classified statements include at least one judgement;
in response to determining that the classified statements does not include at least one judgement,
determine whether the classified statements include at least one inference; and
in response to determining that the classified statements includes at least one inference, generate a cluster around the at least one inference.

17. A method of automatic summarization of content in electronic messages, the method comprising:
receiving, at an email server, an incoming email having an email body having one or more sentences; and
subsequent to receiving the incoming email,
classifying the one or more sentences in the email body individually as a statement of decision, judgement, inference, or fact;
clustering the classified statements into one or more clusters according to a hierarchy of decision, judgement, inference, and fact;
automatically generating one or more summaries of the incoming email based on one or more of the clusters of classified statements; and
inserting data representing one of the generated summaries into the incoming email before transmitting the incoming email to a destination via a computer network.

18. The method of claim 17, further comprising:
assigning, to each classified statement of decision, judgement, inference, or fact, a relevance score; and
calculating a cluster score for the individual clusters based on the assigned relevance scores of the statements in each cluster.

19. The method of claim 17, further comprising:
assigning, to each classified statement of decision, judgement, inference, or fact, a relevance score;
calculating a cluster score for the individual clusters based on the assigned relevance scores of the statements in each cluster; and
wherein selecting one or more of the clusters includes selecting one or more of the clusters based on the calculated cluster scores.

20. The method of claim 17, further comprising:
assigning, to each classified statement of decision, judgement, inference, or fact, a relevance score, wherein the assigned relevance scores are based on at least one of a sender identity of the incoming email or recency of the corresponding statements;
calculating a cluster score for the individual clusters based on the assigned relevance scores of the statements in each cluster; and
wherein selecting one or more of the clusters includes selecting one or more of the clusters based on the calculated cluster score.

* * * * *